United States Patent [19]

Maeda et al.

[11] 3,915,486

[45] Oct. 28, 1975

[54] IMPACT ABSORBING BODY STRUCTURE OF AN AUTOMOTIVE BODY

[75] Inventors: Teruo Maeda; Yoshihiro Kajio; Hideo Shimoe, all of Yokohama, Japan

[73] Assignee: Nissan Motor Company Limited, Yokohama, Japan

[22] Filed: Apr. 15, 1974

[21] Appl. No.: 461,214

[30] Foreign Application Priority Data
Apr. 16, 1973  Japan.............................. 48-42099

[52] U.S. Cl. .................... 293/63; 293/1; 293/89; 188/1 C
[51] Int. Cl.².................... B60R 19/04; F16F 7/12
[58] Field of Search ......... 188/1 C; 213/1 A; 293/1, 293/70, 89, 63, DIG. 3

[56] References Cited
UNITED STATES PATENTS

| | | |
|---|---|---|
| 2,135,749 | 11/1938 | Gullo .............................. 293/DIG. 3 |
| 3,181,821 | 5/1965 | Webb.................................... 188/1 C |
| 3,428,150 | 2/1969 | Muspratt.............................. 188/1 C |
| 3,482,653 | 12/1969 | Maki et al............................. 188/1 C |
| 3,504,568 | 4/1970 | Nakamura et al. ............. 188/1 C X |
| 3,508,633 | 4/1970 | Nishimura et al. ............. 293/DIG. 3 |
| 3,671,068 | 6/1972 | Gerhard................................. 293/1 |
| 3,820,772 | 6/1974 | Kerr et al............................ 293/1 X |
| 3,828,449 | 8/1974 | Miceli................................ 293/70 X |

Primary Examiner—M. Henson Wood, Jr.
Assistant Examiner—Andres Kashnikow

[57] ABSTRACT

For the purpose of significantly reducing the steps for assemblage and accordingly the production cost of an impact absorbing vehicle body structure adapted to dampen out energy of an impact or collision by plastic deformation of deformable members, an assembly preliminarily built by at least one impact absorbing unit and at least one cross member carrying the impact absorbing unit is mounted as a whole on a mounting member which is preliminarily connected to a main body of the vehicle.

5 Claims, 9 Drawing Figures

2

IMPACT ABSORBING BODY STRUCTURE OF AN AUTOMOTIVE BODY

The present invention relates to body structures of automotive vehicles and, more particularly, to shock absorbing vehicle body structures adapted to dampen out energy of impacts exerted thereon when the automotive vehicle encounter collisions at their front or rear ends.

The shock absorbing body structure of an automotive vehicle is adapted to dampen out the energy of an impact through plastic deformation of the structure and includes hollow, elongated deformable members mounted at the front or rear end of the vehicle body and extending in fore-and-aft directions of the vehicle. When the vehicle encounters a collision at its front or rear end, the hollow, elongated deformable members are longitudinally contracted by the impact exerted on the body structure so that the bulk of the energy of the impact is consumed in the plastic deformation of the members.

During production of the vehicle body, the deformable members are mounted separately of each other on the main structure of the vehicle body. Such production schemes gives rise to an increase in the number of steps for assemblage of the body structure and accordingly in the production cost of the vehicle body, also requiring cumbersome procedures during exchange of the collapsed body structure with a new one. The present invention contemplates elimination of these drawbacks which have thus far been inherent in the prior art impact absorbing body structure of an automotive vehicle.

It is, therefore, an important object of the present invention to provide an improved impact absorbing vehicle body structure which is easy to be assembled in a reduced number of steps and which is economical to be manufactured and assembled.

It is another important object of the invention to provide an improved impact absorbing vehicle body structure which can be readily exchanged with a new one when the structure has been collapsed after the vehicle had encountered a collision.

In accordance with the present invention, these objects will be accomplished in a vehicle body structure which comprises an assembly of at least one hollow, elongated deformable unit which is longitudinally contractable when subjected to an impact force and a cross member by which the deformable unit is supported at one end, and a mounting plate which is secured to a main structure of the vehicle and to which the assembly of the deformable unit and the cross member is to be securely yet detachably mounted.

The features of the vehicle body structure according to the present invention will become more apparent from the following description taken in conjunction with the accompanying drawings, in which like reference numerals designated corresponding members and structures throughout the figures and in which.

Figure 1:
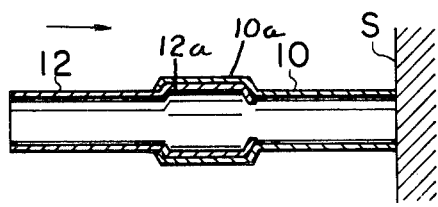
FIG. 1 is a longitudinal sectional view of a typical example of the combination of the hollow, elongated deformable members incorporated into the vehicle body structure to which the present invention is directed.
Figure 2:
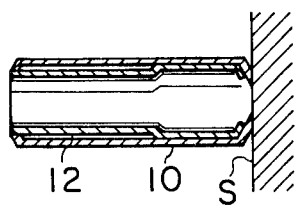
FIG. 2 is a longitudinal sectional view of the combination of the deformable members in a contracted condition.

Reference will now be made to the drawings, first to FIG. 1. The impact absorbing vehicle body structure embodying the present invention is of the type which includes a combination of first and second hollow, elongated deformable members 10 and 12, respectively. The first deformable member 10 is rigidly connected at one end to a rigid support member S and has formed at the opposite end portion a longitudinal section 10a which is enlarged in diameter. The second deformable member 12 also has at one end portion thereof a longitudinal section 12a enlarged in diameter. The enlarged section 10a of the first deformable member 10 has an inside diameter which is substantially equal to an outside diameter of the enlarged section 12a of the second deformable member 12. The first and second deformable members 10 and 12 are combined together in such a manner that the enlarged end section 10a of the first deformable member 10 closely receives therein the enlarged end section 12a of the second deformable member 12 and that the two deformable members 10 and 12 are substantially in line with each other. The first and second deformable members 10 and 12 thus combined together are mounted on front or rear end of a main body of a vehicle so that the deformable members 10 and 12 extend in a fore-and-aft direction of the vehicle, viz., project forward or rearward of the main body of the vehicle. When an impact is exerted on the vehicle body as in the case of a frontal or rear-end collision of the vehicle, a force is applied in a direction of arrow to the combination of the first and second deformable members 10 and 12 with the result that the enlarged end section 12a of the second deformable member 12 closely received in the enlarged end section 10a of the first deformable member 10 is compelled to advance deeper into the first deformable member 10 through the remaining longitudinal portion of the first deformable member 10 having a reduced cross section. The reduced stem portion of the first deformable member 10 is consequently forced to radially expand by the enlarged end section 12a of the second deformable member 12 so that the energy of the impact imparted to the combination of the first and second deformable members 10 and 12 is consumed in major proportion by the plastic deformation of the first deformable member although a limited portion of the energy may be dampened by the deformation or contraction in radial directions of the enlarged end section 12a of the second deformable member 12. When the enlarged end section 12a of the second deformable member 12 has moved throughout the length of the reduced stem portion of the first deformable member 10, the first deformable member 10 is radially expanded so as to have a diameter which is uniform throughout its length, viz., equal to the diameter of the initially enlarged end section 10a of the first deformable member 10, as seen in FIG. 2.

Figure 3:
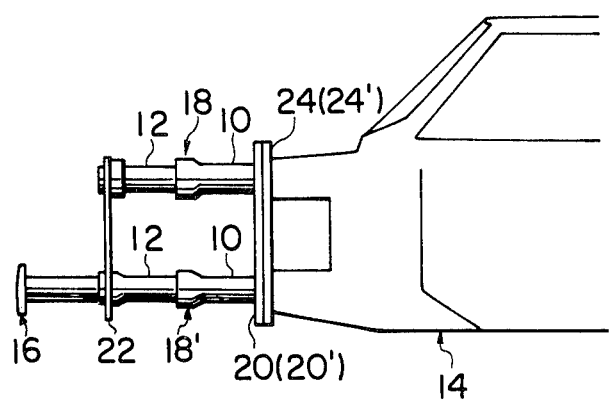
FIG. 3 is a schematic side elevational view which shows part of a vehicle body incorporating a preferred embodiment of the impact absorbing body structure according to the present invention.
Figure 4:
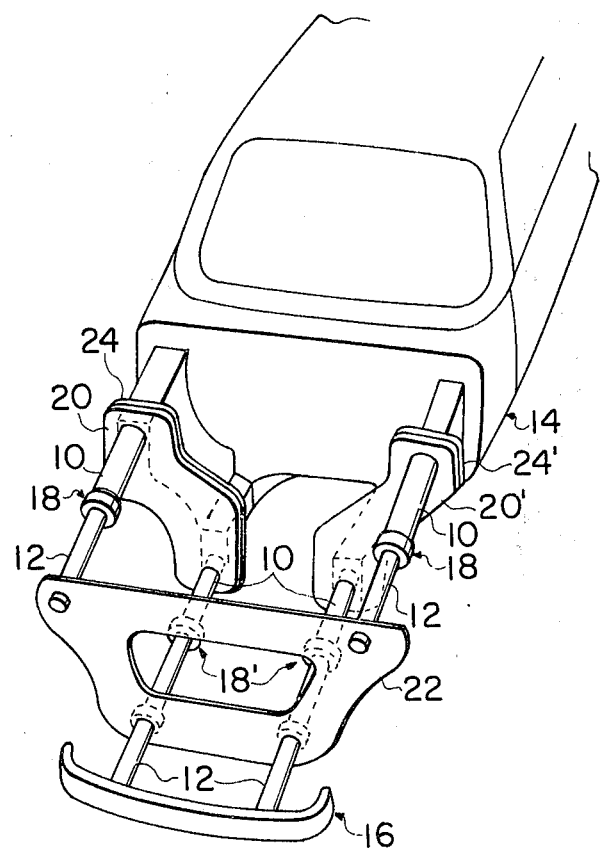
FIG. 4 is a perspective view which shows, in more detail, the impact absorbing vehicle body structure illustrated in FIG. 3.
Figure 5:
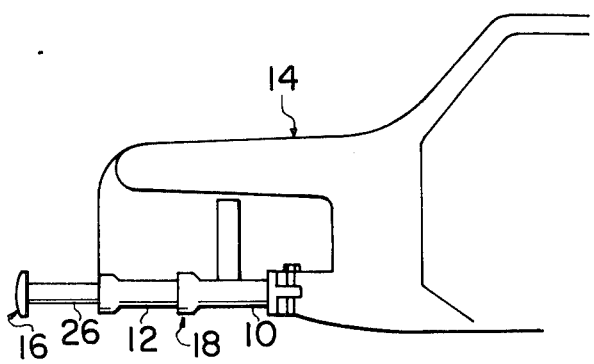
FIG. 5 is a schematic side elevational view which shows part of a vehicle body incorporating another preferred embodiment of the body structure according to the present invention.

FIGS. 3 and 4 illustrate an arrangement in which a multiplicity of impact absorbing units each consisting of the first and second hollow, elongated deformable members 10 and 12 are mounted between a front end of a main body 14 and a front bumper 16 of an automotive vehicle. As seen in FIG. 4, the embodiment of the impact absorbing vehicle body structure herein shown is assumed, by way of example, as comprising four impact absorbing units including a pair of upper and lower impact absorbing units 18 and 18' projecting forwardly from one lateral end of the front end of the main body 14 and a pair of upper and lower impact absorbing units 18 and 18' projecting forwardly from the other lateral end of the front end of the main body 14. The upper and lower impact absorbing units 18 and 18' projecting from one lateral end of the main body 14 are connected at their rearmost ends to a first cross member 20 and, likewise, the upper and lower impact absorbing units 18 and 18' projecting from the other lateral end of the main body 14 are rigidly connected at their rearmost ends to a first cross member 20'. The two upper impact absorbing units 18 are rigidly connected at their foremost ends to a second cross member 22 which is located rearward of the front bumper. The two lower impact absorbing units 18' are, on the other hand, carried at their intermediate portions in apertures formed in a lower portion of the second cross member 22. The assembly thus consisting of the impact absorbing members 18 and 18', the rear cross members 20 and 20' and the front cross members 22 as well as the front bumper 16 is securely mounted on the front end of the main body 14 through a pair of mounting plates 24 and 24' which are bolted or otherwise rigidly fixed to the rear cross members 20 and 20', respectively. The mounting plates 24 and 24' are illustrated in FIG. 4 as having configurations which are in registry with the respectively associated rear cross members 20 and 20'. The impact absorbing body structure shown in FIGS. 3 and 4 has been assumed to form a front end part of the vehicle body but the arrangement of the nature illustrated in FIGS. 3 and 4 may be applied to the rear end structure of the vehicle body substantially as it is. Although, moreover, impact absorbing body structure shown in FIG. 4 has been assumed as consisting of four impact absorbing units 18 and 18', such is merely by way of example and therefore the vehicle body structure according to the present invention may use any number of such units. FIG. 5 illustrates an arrangement in which the impact absorbing units 18 are located underneath the front body structure forming an engine compartment. Where desired, however, the impact absorbing units 18 may be positioned underneath a rear end portion of the vehicle body usually forming a trunk compartment, though not shown in the drawings. Designated by reference numeral 26 in FIG. 5 is a bumper stay through which the front bumper 16 is connected to the impact absorbing units 18 either rigidly or in a manner to permit the bumper stay 26 to be forced into the units 18 when the bumper 16 is subjected to an impact in a fore-and-aft direction of the vehicle. In whichsoever embodiment illustrated in FIGS. 3 and 4 or FIG. 5, the impact absorbing unit 18 or 18' has been made up of the first deformable member 10 connected at its rear end to the main body 14 of the vehicle and the second deformable member 12 projecting forwardly from the first deformable member 10. If desired, however, the second deformable member 12 may be connected to the main body 14 of the vehicle with the first deformable member 10 projecting forwardly from the second deformable member 12, though not illustrated in the drawings.

In assembling the vehicle body incorporating the impact absorbing body structure of the nature thus far described, the assembly of the impact absorbing units and the cross members is first produced separately of the main body of the vehicle with the mounting plates fixed to the main body. The assembly of the impact absorbing members and the cross members is then mounted as a whole on the main body of the vehicle through the mounting plates by the use of suitable fastening means such as bolts. The impact absorbing vehicle body structure according to the present invention is thus adapted to significantly reduce the number of steps and accordingly the cost of assemblage of the vehicle body and to be readily exchanged with a new one when the vehicle body is collapsed as a result of a collision encountered by the vehicle.

Figure 6:
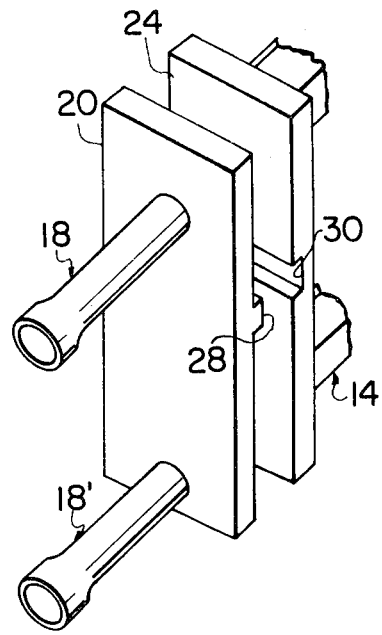
FIG. 6 is a fragmentary perspective view which shows members by which the impact absorbing assembly forming part of the body structure according to the present invention is to be mounted on a main body of an automotive vehicle.

FIG. 6 illustrates a preferred example of an arrangement which is adapted to have the impact absorbing assembly of the construction illustrated in FIGS. 3 and 4 accurately positioned in alignment with the main body of the vehicle during assemblage of the vehicle body. In the arrangement shown in FIG. 6, the rear cross member 20 carrying the impact absorbing units 18 and 18' is formed with a projection 28 on a rear face of the cross member and the mounting plate 24 to be connected to the cross member 20 is formed with a recess 30 which is so located and configured as to be in correspondence with the projection 28. The projection 28 is shown as being in the form of a land extending in a lateral direction of the cross member 20 whereas the recess 30 is shown to be in the form of a groove also extending in a lateral direction of the mounting plate 24. The projection 28 on the cross member 20 and the recess 30 in the mounting plate 24 are positioned relative to each other in such a manner that the impact absorbing assembly of the construction illustrated in FIGS. 3 and 4 can be accurately and automatically aligned with the main body 14 of the vehicle simply by connecting the cross member 20 to the mounting plate 24 with the projection 28 of the former received in the recess 30 in the latter. It may be mentioned that, although the projection 28 is shown to be formed on the cross member 20 and the recess 30 shown to be formed in the mounting plate 24, such is merely by way of example and, therefore, the projection 28 may be formed on the mounting plate 24 and the recess 30 formed in the cross member 20, where desired.

Figure 7:
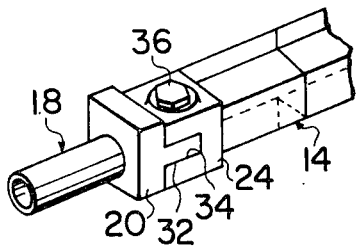
FIG. 7 is similar to FIG. 6 but shows modifications of the members for mounting the impact absorbing assembly on the main body of the automotive vehicle.

FIG. 7 illustrates a similar arrangement which is applicable to the impact absorbing vehicle body structure shown in FIG. 5. As illustrated, the cross member 20 is formed with a lateral land or projection 32 whereas the mounting plate 24 is formed with a lateral groove or recess 34 which is adapted to receive therein the projection 32 of the cross member 20 when the cross member 20 and the mounting plate 24 are combined together. The cross member 20 and the mounting plate 24 are rigidly connected to each other by a bolt 36 which is screwed through the projection 32 of the cross member 20 and the recess 34 in the mounting plate 24. It will be apparent that the lateral land or projection 32 and the lateral groove or recess 34 may be formed in the mounting plate 24 and the cross member 20, respectively, conversely to those shown in FIG. 7.

Figure 8:
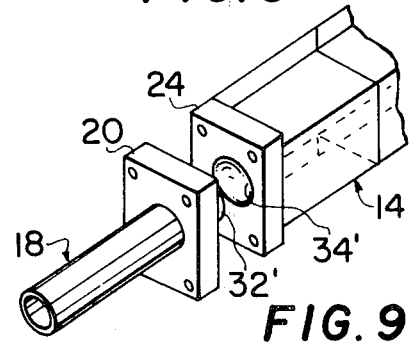
FIG. 8 is a view which is also similar to FIG. 6 but which shows other modifications of the members adapted to mount the impact absorbing assembly on the main body of the vehicle.
Figure 9:
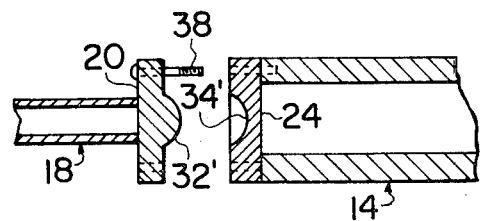
FIG. 9 is a longitudinal sectional view of the members illustrated in FIG. 8.

FIGS. 8 and 9 illustrate a modification of the arrangement shown in FIG. 7. While the projection 32 and the recess 34 of the arrangement illustrated in FIG. 7 is so configured as to have rectangular cross sections, the cross member 20 of the arrangement shown in FIGS. 8 and 9 has a projection 32' which is of a semispherical configuration whereas the mounting plate 24 is formed with a recess 34' which is configured to correspond to the semispherical projection 32'. The cross member 20 and the mounting plate 24 are rigidly connected together by means of bolts 38 which are screwed to the two members in longitudinal directions thereof. Where desired, the projection 32' and the recess 34' may be formed in the mounting member 14 and the cross member 18, respectively, conversely to those shown in FIGS. 8 and 9.

What is claimed is:

1. An impact absorbing body structure for a motor vehicle having a main body structure and a bumper, comprising:
   a mounting plate member secured to a lower rigid portion of said main body structure;
   a cross member adapted to be detachably fixed to said mounting plate member; and
   at least one pair of elongated deformable first units which are longitudinally contractable when subjected to an impact, said first units being firmly connected at one ends thereof to said cross member and being arranged in a parallel spaced relation and extending in the longitudinal direction of the motor vehicle so as to constitute a longitudinal end portion of a vehicle body structure, and said first units having the other ends connected to said bumper.

2. An impact absorbing body structure as claimed in claim 1, in which said cross member and said mounting plate member are detachably connected with each other in substantially male-female relationship.

3. An impact absorbing body structure as claimed in claim 2, in which said cross member is formed with a projection and said mounting plate member is formed with a recess which is positioned and configured to be in correspondence with said projection when the first cross member is to be combined with the mounting plate member.

4. An impact absorbing body structure as claimed in claim 3, in which said first cross member and said mounting plate member are rigidly connected to each other by at least one bolt which is screwed through the projection and the recess.

5. An impact absorbing body structure for a motor vehicle having a main body structure and a bumper, comprising:
   a mounting plate member secured to a rigid portion of said main body structure;
   a first cross member adapted to be detachably fixed to said mounting plate member;
   at least one pair of elongated deformable first units and at least one pair of elongated deformable second units which are longitudinally contractable when subjected to an impact, said first units being firmly connected at one ends thereof to a relatively lower portion of said first cross member, and said second units being firmly connected at one ends thereof to a relatively upper portion of said first cross member, both said first units and second units being arranged in a parallel spaced relation and extending in the longitudinal direction of the motor vehicle so as to constitute a box-shaped framework on a longitudinal end portion of a vehicle body structure;
   a second cross member having a lower portion supporting said first units and an upper portion connected to the other ends of said second units; and
   a pair of elongated members having one ends telescopically connected with the other ends of said first units respectively and the other ends connected with said bumper, said pair of elongated members being constructed to deform said first units upon receiving the impact force due to the vehicle collision.

* * * * *